US009106698B2

(12) United States Patent
Guan et al.

(10) Patent No.: US 9,106,698 B2
(45) Date of Patent: Aug. 11, 2015

(54) METHOD AND SERVER FOR INTELLIGENT CATEGORIZATION OF BOOKMARKS

(71) Applicant: TENCENT TECHNOLOGY (SHENZHEN) COMPANY LIMITED, Shenzhen (CN)

(72) Inventors: Lei Guan, Shenzhen (CN); Sha Mo, Shenzhen (CN); Jiayi Yan, Shenzhen (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 58 days.

(21) Appl. No.: 13/910,478

(22) Filed: Jun. 5, 2013

(65) Prior Publication Data

US 2013/0297827 A1 Nov. 7, 2013

Related U.S. Application Data

(63) Continuation of application No. PCT/CN2011/082620, filed on Nov. 22, 2011.

(30) Foreign Application Priority Data

Dec. 6, 2010 (CN) .......................... 2010 1 0580033

(51) Int. Cl.
*H04L 29/12* (2006.01)
*G06F 17/30* (2006.01)

(52) U.S. Cl.
CPC .......... *H04L 61/15* (2013.01); *G06F 17/30312* (2013.01); *G06F 17/30861* (2013.01); *G06F 17/30884* (2013.01); *H04L 61/30* (2013.01); *H04L 61/3015* (2013.01)

(58) Field of Classification Search
CPC .................... G06F 17/30861; G06F 17/30312; G06F 17/30067; G06F 17/30884
USPC .......... 709/203, 217, 219, 245; 707/736, 748, 707/749, 821, 828; 715/206
See application file for complete search history.

(56) References Cited

U.S. PATENT DOCUMENTS 5,801,702 A * 9/1998 Dolan et al. .................. 709/200
6,100,890 A * 8/2000 Bates et al. ................... 715/826

(Continued)

OTHER PUBLICATIONS

Dominick Benz, Karen H. L. Tso, Lars Schmidt-Thieme, Automatic Bookmark Classification: A Collaborative Approach, 2006, Edinburgh, UK.

*Primary Examiner* — Ramy M Osman
(74) *Attorney, Agent, or Firm* — Dilworth & Barrese, LLP.

(57) ABSTRACT

The present invention, relating to the field of computer technologies, provides a method and server for intelligent categorization of bookmarks. The method includes: acquiring a bookmark link address requested for categorization by a client; categorizing the bookmark link address requested for categorization; and returning a categorization result as a bookmark category to the client. The server includes: an acquiring module, a categorizing module, and a returning module. According to the present invention, by acquiring a bookmark link address requested for categorization by a client, categorizing the bookmark link address requested for categorization, and returning a categorization result as a bookmark category to the client, the objective of intelligent categorization of the bookmarks is achieved so that time consumption caused by users' manual organization and categorization of the bookmarks is avoided. In addition, a better user experience on the browser is brought to users.

13 Claims, 2 Drawing Sheets

(56) References Cited

U.S. PATENT DOCUMENTS

| | | |
|---|---|---|
| 6,275,862 B1 | 8/2001 | Sharma et al. |
| 6,574,625 B1 * | 6/2003 | Bates et al. .................. 709/217 |
| 6,832,350 B1 * | 12/2004 | Bates et al. .................. 715/206 |
| 7,747,937 B2 * | 6/2010 | Rojer ............................ 715/206 |
| 2003/0101216 A1 * | 5/2003 | Gupta ........................... 709/203 |
| 2004/0205499 A1 | 10/2004 | Gupta |
| 2006/0015509 A1 * | 1/2006 | Naitou .......................... 707/10 |

\* cited by examiner

METHOD AND SERVER FOR INTELLIGENT CATEGORIZATION OF BOOKMARKS

This application claims priority to Chinese Patent Application No. 201010580033.X, filed with Chinese Patent Office on Dec. 6, 2010 and entitled "METHOD AND SERVER FOR INTELLIGENT CATEGORIZATION OF BOOKMARKS", which is incorporated herein by reference in its entirety.

FIELD OF THE INVENTION

The present invention relates to the field of computer technologies, and particularly, to a method and service for intelligent categorization of bookmarks.

BACKGROUND OF THE INVENTION

With the development of Internet technologies, it is a major way for users to acquire and search for information by accessing Web sites using a browser. Users generally collect and store their desired Web sites or Web pages when browsing, so that these contents can be quickly and conveniently retrieved in the future.

In the prior art, the collected bookmarks is managed by the browser mostly based on users' manual processing. For example, users manually create categories for the bookmarks, manually judge the category of each stored bookmark, and manually categorize each bookmark.

After analysis on the prior art, the inventors find that the prior art has at least the following disadvantages:

According to the prior art, the browser cannot automatically categorize the bookmarks, and the users need to manually judge the categories of the bookmarks, and manually categorize the bookmarks after judgment. For the users, this process is time consuming and also affects user experience on the browser.

SUMMARY OF THE INVENTION

Embodiments of the present invention provide a method and server for intelligent categorization of bookmarks. The technical solutions are as follows:

An embodiment of the present invention provides a method for intelligent categorization of bookmarks, including:

acquiring a bookmark link address requested for categorization by a client;

categorizing the bookmark link address requested for categorization; and returning a categorization result as a bookmark category to the client.

As a preferred alternative of the above technical solution, the categorizing the bookmark link address requested for categorization specifically includes:

performing link address matching in a link library for the bookmark link address requested for categorization, where the link library is comprised of preset link addresses, the preset link addresses being link addresses corresponding to preset network address categories; and if a link address in the link library matches the bookmark link address requested for categorization, using the network address category corresponding to the matched link address as the categorization result.

As a preferred alternative of the above technical solution, a keyword is preset for the network address category correspondingly, and after performing link address matching in a link library for the bookmark link address requested for categorization, the method includes:

if no link address in the link library matches the bookmark link address requested for categorization, extracting key information from the Web page corresponding to the bookmark link address requested for categorization, and performing word segmentation for the key information to generate a keyword; and performing a similarity comparison between the generated keyword and the preset keyword corresponding to each network address category, and using the network category corresponding to the preset keyword with the largest similarity as the categorization result.

As a preferred alternative of the above technical solution, before categorizing the bookmark link address requested for categorization, the method includes:

presetting at least one network address category, and setting a keyword corresponding to each network address category; and correspondingly, the categorizing the bookmark link address requested for categorization specifically includes:

extracting key information from the Web page corresponding to the bookmark link address requested for categorization, and performing word segmentation for the key information to generate a keyword;

performing a similarity comparison between the generated keyword and the preset keyword corresponding to each network address category, and using the network category corresponding to the preset keyword with the largest similarity as the categorization result.

As a preferred alternative of the above technical solution, before categorizing the bookmark link address requested for categorization, the method includes:

presetting a network address category; and the categorizing the bookmark link address requested for categorization specifically includes:

if no preset network address category matches the bookmark link address requested for categorization, using a default category as the categorization result.

An embodiment of the present invention provides a server for intelligent categorization of bookmarks, including:

an acquiring module, configured to acquire a bookmark link address requested for categorization by a client;

a categorizing module, configured to categorize the bookmark link address requested for categorization; and a returning module, configured to return a categorization result as a bookmark category to the client.

As a preferred alternative of the above technical solution, the server further includes:

a presetting module, configured to preset a network address category, and preset a link address corresponding to the network address category, where the preset link addresses constitute a link library; and correspondingly, the categorizing module includes:

a first categorizing unit, configured to perform link address matching in the link library for the bookmark link address requested for categorization;

a first matching unit, configured to use, if the link library has a link address matches the bookmark link address requested for categorization, the network address category corresponding to the matched link address as the categorization result.

As a preferred alternative of the above technical solution, the presetting module is further configured to preset a keyword corresponding to the network address category, and correspondingly, the categorization module further includes:

a first generating unit, configured to: after the first categorizing unit performs link address matching in the link library for the bookmark link address requested for categorization, if no link address in the link library matches the bookmark link address requested for categorization, extract key information from the Web page corresponding to the bookmark link address requested for categorization, and perform word segmentation for the key information to generate a keyword; and a second matching unit, configured to perform a similarity comparison between the generated keyword and the preset keyword corresponding to each network address category, and use the network category corresponding to the preset keyword with the largest similarity as the categorization result.

As a preferred alternative of the above technical solution, the server further includes:

a presetting module, configured to preset at least one network address category, and set a keyword corresponding to each network address category; and correspondingly, the categorizing module comprises:

a second generating unit, configured to extract key information from the Web page corresponding to the bookmark link address requested for categorization, and perform word segmentation for the key information to generate a keyword; and a third matching unit, configured to perform a similarity comparison between the generated keyword and the preset keyword corresponding to each network address category, and use the network category corresponding to the preset keyword with the largest similarity as the categorization result.

As a preferred alternative of the above technical solution, the server further includes:

a presetting module, configured to preset at least one network address category; and correspondingly, the categorizing module comprises:

a default processing unit, configured to use, if no preset network address category matches the bookmark link address requested for categorization, a default category as the categorization result.

The technical solutions according to the embodiments of the present invention achieve the following beneficial effects: by acquiring a bookmark link address requested for categorization by a client, categorizing the bookmark link address requested for categorization, and returning a categorization result as a bookmark category to the client, the objective of intelligent categorization of the bookmarks is achieved so that time consumption caused by users' manual organization and categorization of the bookmarks is avoided. In addition, a better user experience on the browser is brought to users.

BRIEF DESCRIPTION OF THE DRAWINGS

For a better understanding of the technical solutions in the embodiments of the present invention, the accompanying drawings for illustrating the embodiments are briefly described below. Apparently, the accompanying drawings in the following description illustrate only some embodiments of the present invention, and a person skilled in the art can derive other accompanying drawings from these accompanying drawings without any creative efforts.

DETAILED DESCRIPTION OF THE EMBODIMENTS

To make the objectives, technical solutions, and advantages of the present invention clearer, the following describes the embodiments of the present invention in detail below with reference to the accompanying drawings.

Embodiment 1

Figure 1:
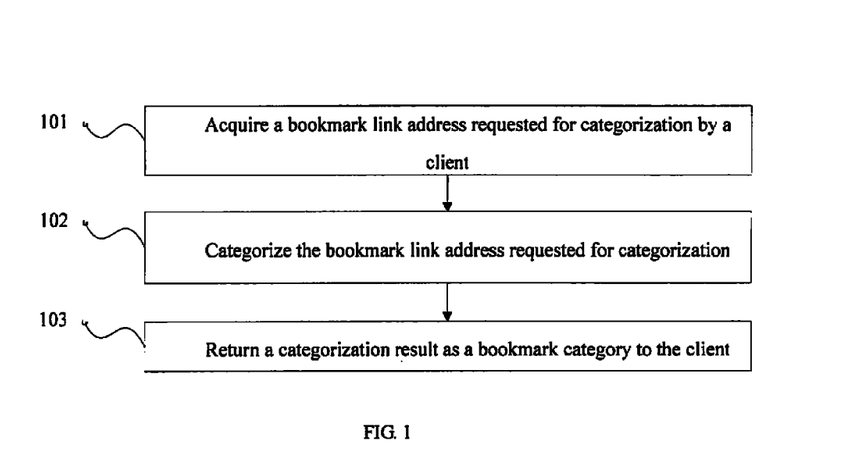
FIG. 1 is a schematic flowchart of a method for intelligent categorization of bookmarks according to Embodiment 1 of the present invention.

The first embodiment of the present invention provides a method for intelligent categorization of bookmarks, the procedure of which is as shown in FIG. 1, including:

Step 101: acquiring a bookmark link address requested for categorization by a client;

Step 102: categorizing the bookmark link address requested for categorization; and Step 103: returning a categorization result as a bookmark category to the client.

In this embodiment, by acquiring a bookmark link address requested for categorization by a client, categorizing the bookmark link address requested for categorization, and returning a categorization result as a bookmark category to the client, the objective of intelligent categorization of the bookmarks is achieved so that time consumption caused by users' manual organization and categorization of the bookmarks is avoided. In addition, a better user experience on the browser is brought to users.

Embodiment 2

Figure 2:
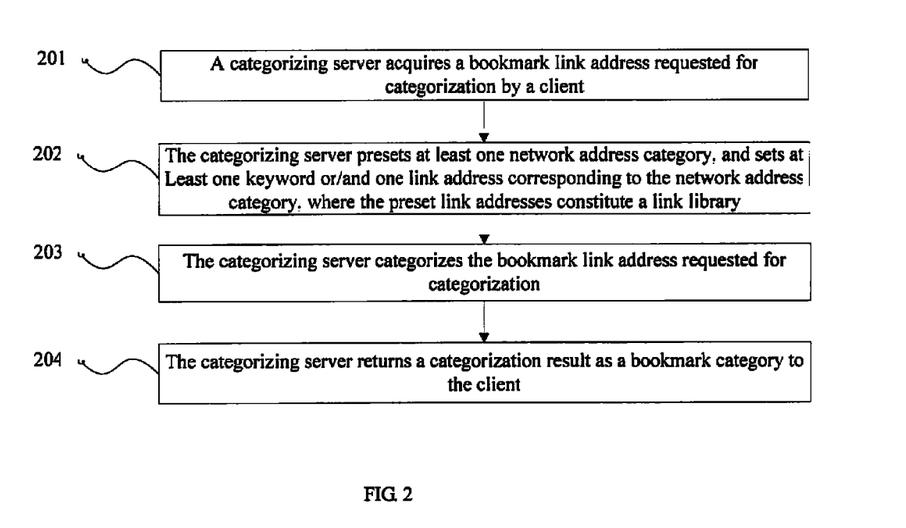
FIG. 2 is a schematic flowchart of a method for intelligent categorization of bookmarks according to Embodiment 2 of the present invention.

The second embodiment of the present invention serves as an improvement of the first embodiment, the procedure of which is as shown in FIG. 2, including the following steps:

Step 201: A categorizing server acquires a bookmark link address requested for categorization by a client.

Specifically, when a user uses a browser to collect and store Web pages, the browser sends bookmark link addresses of the Web pages to a server, and the bookmarks are automatically categorized by using powerful calculation capabilities of the server.

The categorizing server is a server for intelligently categorizing the bookmarks.

Step 202: The categorizing server presets at least one network address category, and sets at least one keyword or/and one link address corresponding to the network address category, where the preset link addresses constitute a link library.

Specifically, a plurality of network address categories, for example, science and technology, education, entertainment, blog, and the like, are preset. In addition, keywords or/and link addresses corresponding to the network address categories are set, where the preset link addresses constitute a link library.

Further, in the area of current natural language processing, a vector space model is mainly used for expressions of text. Since it is improper to directly process the original form of natural language using mathematical method, therefore, automatic processing of the natural language is hard to implement. The essence of the vector space model is to describe a document using vectors, for example $(W_1, W_2, W_3, \ldots, W_m)$, where $W_m$ is the weight of the $m^{th}$ feature item. The feature item may be a term or phrase. Generally, it is preferable to use a term as the feature item, instead of using a phrase. Therefore, the selected feature items are used as each vector of the vector space. The feature items are used as dimensions of the vectors to represent a document, and term frequency is used to represent a vector component corresponding to the feature item. The method for calculating a term frequency is mainly based on the following TF-IDF formula:

$$W(t, d) = \frac{tf(t, d) \times \log(N/n_i + 0.01)}{\sqrt{\sum_{i=1}^{m} [tf(t, d) \times \log(N/n_i + 0.01)]^2}}$$

W (t, d) is the weight of term t in document d; tf (t, d) is the term frequency of term t in document d; N is the total number of training documents; n, is the number of documents where term t is present in the training document set, where i=1, 2, . . . , m (m is the number of terms); and the denominator of the formula is a normalization factor. TF-IDF is a commonly used weighting technology for information search and information exploration, and is widely used in information search, document categorization, and other related fields, for evaluating importance of a word in a document of a document set or a text corpus. The importance of a word proportionally increases with increase of the frequency of the word in a document, and meanwhile proportionally decreases with increase of the frequency of the word in a text corpus. The more frequently a term is present in a document, the stronger the capability of the term for distinguishing document attribute, and the greater the weight value.

Further, the weight of each keyword corresponding to each preset network address category is calculated by using the TF-IDF formula. The weights of all terms in the same term library are combined to form an N-dimensional vector, where N represents the number of keywords in the term library. The N-dimensional vector can be represented as (weight of term 1, weight of term 2, weight of term 3, weight of term 4, . . . , and weight of term N). The weight of each keyword forms the vector of preset network address category, for calculating similarity with the bookmark of the Webpage collected by the user.

Step 203: The categorizing server categorizes the bookmark link address requested for categorization.

Specifically, after a server side receives the bookmark link addresses requested for categorization from the client, a load balancing server assigns the bookmark link addresses to different categorizing servers for categorization.

Further, according to this embodiment, the bookmark is categorized in three manners. The first manner is to perform matching in the link library for the bookmark. The second manner is to perform a similarity comparison between the vector space model and the keyword of the preset category to obtain a categorization result, if the matching fails. The third manner is to directly perform a similarity comparison between the vector space model and the keyword of the preset category to obtain a categorization result, instead of performing link matching. Therefore, step 203 may specifically include:

Step 2031: A load balancing server is employed to share the workload of the categorizing servers.

Specifically, the server side employs a load balancing server before a categorizing server cluster to balance the workload of the categorizing servers. The load balancing server is specifically configured to receive the bookmark link addresses requested for categorization from the client, then distribute the link addresses in the categorizing server cluster according to a configured balancing policy, and maintain availability of the server.

Step 2032: The categorizing server performs link address matching in the link library for the bookmark link address requested for categorization.

Specifically, after receiving the bookmark link address requested for categorization assigned by the load balancing server the categorizing server, the categorizing server firstly performs domain name matching in the link library for the link address. A domain name is the name of a computer or a computer group on the network, consisting of a string of characters spaced by a dot.

Step 2033: If a link address in the link library matches the bookmark link address requested for categorization, the categorizing server uses the network address category corresponding to the matched link address as the categorization result.

Specifically, the majority of known domain names can be found by performing domain name matching, and the network address category corresponding to the matched link address is used as the categorization result. Step 204 is performed to return the categorization result to the client.

For example, the domain name of a bookmark link address stored by the user is cnbeta.com, cnbeta.com is recorded in the link library in advance, and the domain name is categorized into the category of science and technology news. After receiving the request from the client, the server side performs matching in the link library and obtains the domain name, and finds that the network address category corresponding to the domain name is science and technology news, and returns the category to the client.

Further, if no link address in the link library matches the bookmark link address stored by the user, step 2034 is performed.

Step 2034: If no link address in the link library matches the bookmark link address requested for categorization, the categorizing server extracts key information from the Web page corresponding to the bookmark link address requested for categorization, and performs word segmentation for the key information to generate a keyword.

Therefore, step 2034 may specifically include:

Step 20341: extracting key information of the Web page corresponding to the bookmark address.

Specifically, if no link address in the link library matches the bookmark link address stored by the user, this means that the categorizing server does not record the link address and cannot judge, according to known information, which type the Web site belongs to. In this case, the categorizing server analyzes the Web page corresponding to the link address to judge the type of the Web site.

Further, the categorizing server accesses the link address, extracts key information of the Web page, finds the title, keyword, and specific content on the Web page, and analyzes the information. The method for extracting Web page information belongs to the prior art, which is not limited in the embodiments of the present invention.

Step 20342: performing word segmentation for the key information to generate a keyword.

Specifically, word segmentation is performed for the extracted key information to generate a keyword. Word segmentation is a process of combining consecutive character sequences into a new word sequence according to a specific rule. The categorizing server analyzes the category of the segmented word. The method for segmenting Chinese words belongs to the prior art, which is not limited in the embodiments of the present invention.

Step 20343: calculating a vector of the generated keyword.

Specifically, the weight of each term in the keyword is calculated using the TF-IDF formula in step 202 to obtain a vector of the generated keyword (weight of term 1, weight of term 2, weight of term 3, weight of term 4, . . . , weight of term N).

Step 2035: The categorizing server performs a similarity comparison between the generated keyword and the preset keyword corresponding to each network address category, and uses the network category corresponding to the preset keyword with the largest similarity as the categorization result.

Specifically, the computer is used to automatically categorize objects such as files and documents, which typically includes automatic aggregation and automatic categorization. The automatic aggregation differs from the automatic categorization in that: in the automatic aggregation, it is not necessary to define a categorization system in advance and calculating similarity, and the server does not need to collect a feature term library and link addresses for categorization in advance, which, as a result, results in a poorer effect than the automatic categorization. With regard to the automatic categorization, a predetermined categorization system is required, and a batch of pre-categorized objects is needed for each category as a training document set. During actual categorization, one or multiple categories are determined, according to the acquired categorization knowledge, for the documents to be categorized.

In the embodiments of the present invention, the automatic categorization method is used to calculate, by using the document vector space model, the key information of the Web page after extraction and word segmentation, and determine the category of the document. Before calculation for categorization, the categorization system is predetermined, and a corresponding term library is provided for each category as a training document set. Categorization of a text/document is performed under a specific categorization system, and the associated category of text/document is automatically determined according to the content of the text/document. From the aspect of mathematics, text/document categorization is a mapping process, where a text/document with no specified category is mapped to a known category.

Further, a similarity calculation is performed between the vector of the generated keyword and the vectors of all network address categories, and all similarity values obtained are sequenced in descending order. Therefore, it can be determined that the Web page corresponding to the bookmark link address belongs to the network address category corresponding to the maximum similarity.

The calculated similarity between two documents is represented by a cosine value of the angle formed by the corresponding vectors, and the calculation formula is as follows:

$$Sim(d_i, d_j) = \cos\theta = \frac{\sum_{k=1}^{n} w_{ik} \times w_{jk}}{\sqrt{\left(\sum_{k=1}^{n} w_{ik}^2\right)\left(\sum_{k=1}^{n} w_{jk}^2\right)}}$$

$W_{ik}$ and $W_{jk}$ represent weight values of the $K^{th}$ features in documents $d_i$ and $d_j$ respectively, and $Sim(d_i,d_j)$ represents the similarity between document $d_i$ and document $d_j$.

Assuredly, similarity comparison is merely one way of determining the category. The category may also be determined in other ways, which is not limited in the embodiments of the present invention.

Step 2036: The categorizing server extracts key information from the Web page corresponding to the bookmark link address requested for categorization, and performs word segmentation for the key information to generate a keyword.

Specifically, during the process of categorizing the bookmark link address requested for categorization, matching in the link library may not be performed, and similarity calculation is directly performed instead. Therefore, step 2036 may specifically include:

Step 20361: extracting key information of the Web page corresponding to the bookmark address;

Step 20362: performing word segmentation for the key information to generate a keyword; and Step 20363: calculating a vector of the generated keyword.

Further, step 2036 shares the same concept and principle with step 2034, which is not detailed herein any further.

Step 2037: The categorizing server performs a similarity comparison between the generated keyword and the preset keyword corresponding to each network address category, and uses the network category corresponding to the preset keyword with the largest similarity as the categorization result.

Further, step 2037 shares the same concept and principle with step 2035, which is not detailed herein any further.

Step 2038: If no preset network address category matches the bookmark link address requested for categorization, the categorizing server uses a default category as the categorization result.

Specifically, if no result is obtained after the categorizing server performs matching in the link library, and similarity calculation for the bookmark link address, the category of the bookmark is categorized into the default category and returned to the client.

Step 204: The categorizing server returns a categorization result as a bookmark category to the client.

Specifically, in the above process, matching is performed in the link library for the bookmark link address and/or document similarity is calculated for the bookmark link address, and the categorization result is returned to the client.

By the matching and calculation performed by the categorizing server, the category of the bookmark link address is obtained, and the category is returned to the load balancing server, and the load balancing server returns the category to the browser of the client. After receiving the category of the bookmark link address, the browser automatically organizes and places the bookmark to the folder of the category according to the received category, thereby completing intelligent organization and categorization of the bookmarks of the user.

Specifically, if no result is obtained after the categorizing server performs matching in the link library and similarity calculation for the bookmark link address, the category of the bookmark is categorized into the default category and returned to the client. The client places such uncategorized bookmark under the default category directory.

In this embodiment, by acquiring a bookmark link address requested for categorization, categorizing the bookmark link address, and returning a categorization result as a bookmark category to the client, the objective of intelligent categorization of the bookmarks is achieved. In addition, for a bookmark link address not matched successfully in a preset link library, by extracting key information of the Web page corresponding to the bookmark link address, performing word segmentation for the key information, and performing a similarity calculation for the keyword and the keyword corresponding to the preset network address category, a corresponding category with the greatest similarity is obtained and used as the category of the bookmark link address. In this way, time consumption caused by users' manual organization and categorization of the bookmarks is avoided. In addition, a better user experience on the browser is brought to users.

Embodiment 3

Figure 3:
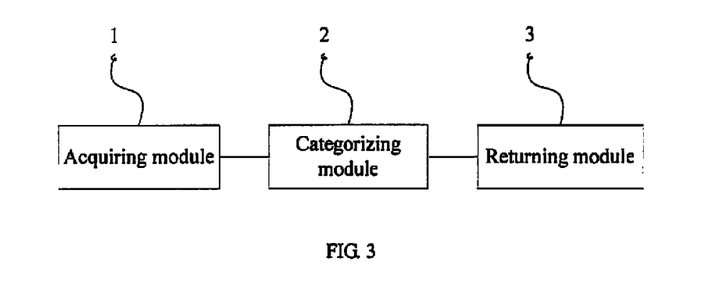
FIG. 3 is a schematic structural diagram of a server for intelligent categorization of bookmarks according to Embodiment 3 of the present invention.

The third embodiment of the present invention provides a server for intelligent categorization of bookmarks, the structure of which is as shown in FIG. 3. The server includes:

an acquiring module 1, configured to acquire a bookmark link address requested for categorization by a client;

a categorizing module 2, configured to categorize the bookmark link address requested for categorization; and a returning module 3, configured to return a categorization result as a bookmark category to the client.

In this embodiment, by acquiring a bookmark link address requested for categorization by a client, categorizing the bookmark link address requested for categorization, and returning a categorization result as a bookmark category to the client, the objective of intelligent categorization of the bookmarks is achieved so that time consumption caused by users' manual organization and categorization of the bookmarks is avoided. In addition, a better user experience on the browser is brought to users Embodiment 4

Figure 4:
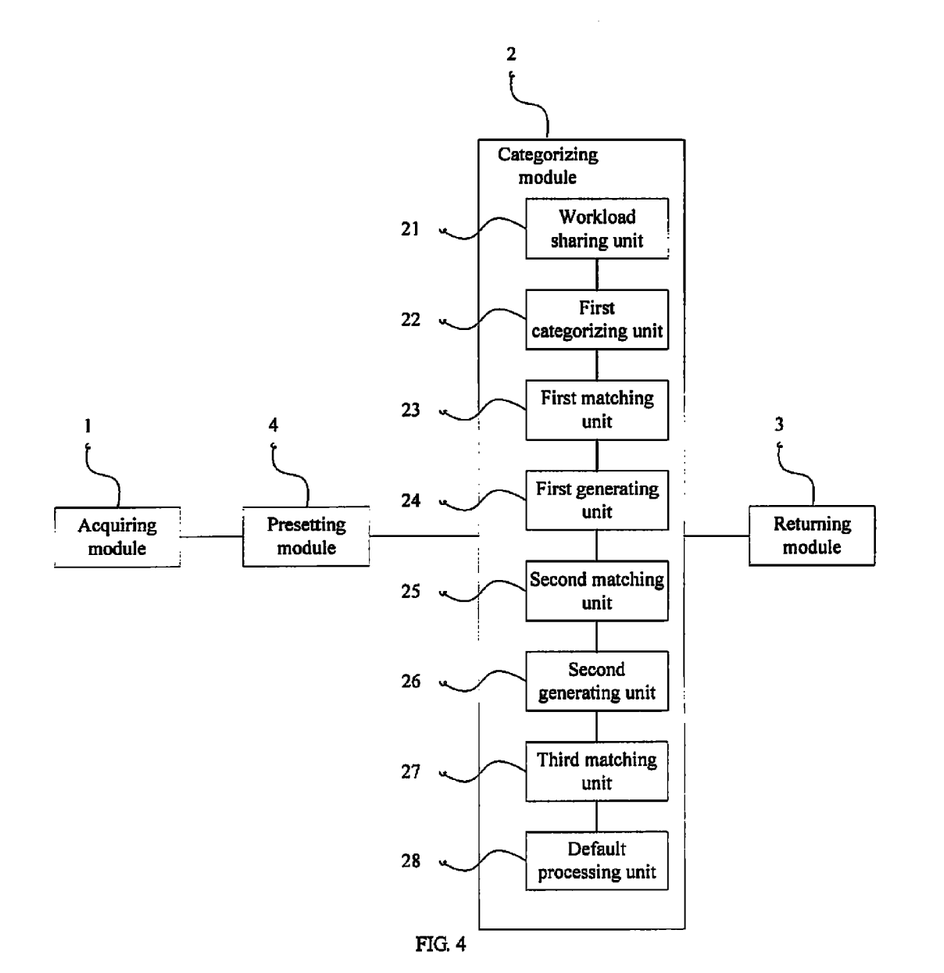
FIG. 4 is a schematic structural diagram of a server for intelligent categorization of bookmarks according to Embodiment 4 of the present invention.

The fourth embodiment of the present invention serves as an improvement of the third embodiment, the structure of which is as shown in FIG. 4. The server for intelligent categorization of bookmarks includes: an acquiring module 1, a categorizing module 2, and a returning module 3, and may further include a presetting module 4.

The acquiring module 1 is configured to acquire a bookmark link address requested for categorization by a client.

Specifically, when a user uses a browser to collect and store Web pages, the browser sends bookmark link addresses of the Web pages to a server, and the links are automatically categorized by using powerful calculation capabilities of the server.

The presetting module 4 is configured to: before the categorizing module 2 performs the operation, preset at least one network address category, and set at least one keyword or/and one link address corresponding to the network address category, where the preset link addresses constitute a link library.

Specifically, a plurality of network address categories, for example, science and technology, education, entertainment, blog, and the like, are preset. In addition, keywords or/and link addresses corresponding to the network address categories are set, where the preset link addresses constitute a link library.

Further, the weight of each keyword corresponding to each preset network address category is calculated by using the TF-IDF formula. The weights of all terms in the same term library are combined to form an N-dimensional vector, where N represents the number of keywords in the term library. The N-dimensional vector can be represented as (weight of term 1, weight of term 2, weight of term 3, weight of term 4, . . . , and weight of term N). The weight of each keyword forms the vector of preset network address category, for calculating similarity with the bookmark of the Webpage collected by the user.

The categorizing module 2 is configured to categorize the bookmark link address requested for categorization.

Specifically, the categorizing module 2 includes a first categorizing unit 22 and a first matching unit 23; or the categorizing module 2 includes a first generating unit 24 and a second matching unit 25; or the categorizing module 2 includes a second generating unit 26 and a third matching unit 27. Moreover, the categorizing module 2 may further include a workload sharing unit 21.

The workload sharing unit 21 is configured to employ a load balancing server to share the workload of a cloud server.

Specifically, the server side employs a load balancing server before a categorizing server cluster to balance the workload of the categorizing server. The load balancing server is specifically configured to receive the bookmark link addresses requested for categorization from the client, then distribute the link addresses in the categorizing server cluster according to a configured balancing policy, and maintain availability of the server.

The first categorizing unit 22 is configured to perform link address matching in a link library for the bookmark link address requested for categorization.

Specifically, after receiving the bookmark link address requested for categorization assigned by the load balancing server the categorizing server, the categorizing server firstly performs domain name matching in the link library for the link address. A domain name is the name of a computer or a computer group on the network, consisting of a string of characters spaced by a dot.

The first matching unit 23 is configured to use, if a link address in the link library matches the bookmark link address requested for categorization, the network address corresponding to the matched link address as the categorization result.

Specifically, the majority of known domain names can be found by performing domain name matching, and the network address category corresponding to the matched link address is used as the categorization result.

The first generating unit 24 is configured to: after the first categorizing unit performs the operation, if no link address in the link library matches the bookmark link address requested for categorization, extract key information from the Web page corresponding to the bookmark link address requested for categorization, and perform word segmentation for the key information to generate a keyword.

Specifically, the first generating unit 24 may specifically include: a first extracting subunit, a first generating subunit, and a first calculating subunit.

The first extracting subunit is configured to extract key information of the Web page corresponding to the bookmark link address.

Specifically, if no link address in the link library matches the bookmark link address stored by the user, this means that the categorizing server does not record the link address and cannot judge, according to known information, which type the Web site belongs to. In this case, the categorizing server analyzes the Web page corresponding to the link address to judge the type of the Web site.

Further, the categorizing server accesses the link address, extracts key information of the Web page, finds the title, keyword, and specific content on the Web page, and analyzes the information. The method for extracting Web page information belongs to the prior art, which is not limited in the embodiments of the present invention.

The first generating subunit is configured to perform word segmentation for the key information to generate a keyword.

Specifically, word segmentation is performed for the extracted key information to generate a keyword. Word segmentation is a process of combining consecutive character sequences into a new word sequence according to a specific rule. The categorizing server analyzes the category of the segmented word. The method for segmenting Chinese words belongs to the prior art, which is not limited in the embodiments of the present invention.

The first calculating subunit is configured to calculate a vector of the generated keyword.

Specifically, the weight of each term in the keyword is calculated using the TF-IDF formula to obtain a vector of the generated keyword (weight of term 1, weight of term 2, weight of term 3, weight of term 4, . . . , weight of term N).

The second matching unit 25 is configured to perform a similarity comparison between the generated keyword and the preset keyword corresponding to each network address category, and use the network category corresponding to the preset keyword with the largest similarity as the categorization result.

Further, a similarity calculation is performed between the vector of the generated keyword and the vectors of all network address categories, and all similarity values obtained are sequenced in descending order. Therefore, it can be determined that the Web page corresponding to the bookmark link address belongs to the network address category corresponding to the maximum similarity.

The second generating unit 26 is configured to extract key information from the Web page corresponding to the bookmark link address requested for categorization, and perform word segmentation for the key information to generate a keyword.

Specifically, during the process of categorizing the bookmark link address requested for categorization, matching in the link library may not be performed.

Further, the second generating unit 26 may specifically include:

a second extracting subunit, configured to extract key information of the Web page corresponding to the bookmark link address;

a second generating subunit, configured to perform word segmentation for the key information to generate a keyword; and a second calculating subunit, configured to calculate a vector of the generated keyword.

Further, the second generating unit 26 shares the same concept and principle with the first generating unit 24, which is not detailed herein any further.

The third matching unit 27 is configured to perform a similarity comparison between the generated keyword and the preset keyword corresponding to each network address category, and use the network category corresponding to the preset keyword with the largest similarity as the categorization result.

Specifically, the third matching unit 27 shares the same concept and principle with the second matching unit 25, which is not detailed herein any further.

The default processing unit 28 is configured to use, if no preset network address category matches the bookmark link address requested for categorization, a default category as the categorization result.

The returning module 3 is configured to return a categorization result as a bookmark category to the client.

Specifically, by the matching and calculation performed by the categorizing server, the category of the bookmark link address is obtained, and the category is returned to the load balancing server, and the load balancing server returns the category to the browser of the client. After receiving the category of the bookmark link address, the browser automatically organizes and places the bookmark to the folder of the category according to the received category, thereby completing intelligent organization and categorization of the bookmarks of the user.

Specifically, if no result is obtained after the categorizing server performs matching in the link library, and similarity calculation for the bookmark link address, the category of the bookmark is categorized into the default category and returned to the client. The client places such uncategorized bookmark under the default category directory.

In this embodiment, by acquiring a bookmark link address requested for categorization by a client, categorizing the bookmark link address requested for categorization, and returning a categorization result as a bookmark category to the client, the objective of intelligent categorization of the bookmarks is achieved. In addition, for a bookmark link address not matched successfully in a preset link library, by extracting key information of a Web page corresponding to the bookmark link address, performing word segmentation for the key information, and performing a similarity calculation for the keyword and the keyword corresponding to the preset network address category, a corresponding category with the greatest similarity is obtained and used as the category of the bookmark link address. In this way, time consumption caused by users' manual organization and categorization of the bookmarks is avoided. In addition, a better user experience on the browser is brought to users.

The servers described in the third and fourth embodiments of the present invention share the same concept and principle with the methods described in the first and second embodiments. Therefore, with respect to the first and second embodiments, the same parts in the third and fourth embodiments are not detailed herein any further.

According to the embodiments of the present invention, the integrated unit, if implemented in the form of a software functional unit and sold or used as a separate product, may be stored in a computer-readable storage medium. Based on such understandings, the technical solutions or part of the technical solutions disclosed in the present invention that makes contributions to the prior art may be essentially embodied in the form of a software product. The software product may be stored in a storage medium. The software product includes a number of instructions that enable a computer (PC, Web site server, or network device) device to execute the methods provided in the embodiments of the present invention or part of the steps. The storage medium include various mediums capable of storing program code, for example, read only memory (ROM), random access memory (RAM), magnetic disk, or compact disc-read only memory (CD-ROM).

Described above are merely preferred embodiments of the present invention, but are not intended to limit the present invention. Any modification, equivalent replacement, or improvement made without departing from the spirit and principle of the present invention should fall within the protection scope of the present invention.

What is claimed is:

1. A computer-implemented method for intelligent categorization of bookmarks, comprising executing on a processor the steps of:

acquiring by the processor a bookmark link address requested for categorization by a client;

categorizing by the processor the bookmark link address requested for categorization; and returning a categorization result as a bookmark category to the client, wherein the categorizing the bookmark link address requested for categorization specifically comprises:

performing by the processor link address matching in a link library for the bookmark link address requested for categorization, wherein the link library is comprised of preset link addresses, the preset link addresses being link addresses corresponding to preset network address categories; and if a link address in the link library matches the bookmark link address requested for categorization, using the network address category corresponding to the matched link address as the categorization result, wherein a keyword is preset for the network address category correspondingly, and after performing link address matching in a link library for the bookmark link address requested for categorization, the computer-implemented method further comprises executing on the processor the steps of:

if no link address in the link library matches the bookmark link address requested for categorization, extracting by the processor key information from the Web page corresponding to the bookmark link address requested for categorization, and performing by the processor word segmentation for the key information to generate a keyword; and performing by the processor a similarity comparison between the generated keyword and the preset keyword corresponding to each network address category, and using by the processor the network category corresponding to the preset keyword with the largest similarity as the categorization result.

2. The computer-implemented method according to claim 1, wherein before categorizing the bookmark link address requested for categorization, the computer-implemented method comprises executing on the processor the steps of:

presetting by the processor at least one network address category, and setting by the processor a keyword corresponding to each network address category; and correspondingly, the categorizing the bookmark link address requested for categorization specifically comprises executing on the processor the steps of:

extracting by the processor key information from the Web page corresponding to the bookmark link address requested for categorization, and performing by the processor word segmentation for the key information to generate a keyword;

performing by the processor a similarity comparison between the generated keyword and the preset keyword corresponding to each network address category, and using by the processor the network category corresponding to the preset keyword with the largest similarity as the categorization result.

3. The computer-implemented method according to claim 1, wherein before categorizing the bookmark link address requested for categorization, the computer-implemented method comprises executing on the processor the steps of:

presetting by the processor at least one network address category; and the categorizing the bookmark link address requested for categorization specifically comprises executing on the processor the steps of:

if no preset network address category matches the bookmark link address requested for categorization, using by the processor a default category as the categorization result.

4. A computer-implemented method for intelligent categorization of bookmarks, comprising executing on the processor the steps of:

acquiring by the processor a bookmark link address requested for categorization by a client;

categorizing by the processor the bookmark link address requested for categorization; and returning by the processor a categorization result as a bookmark category to the client, wherein before categorizing the bookmark link address requested for categorization, the computer-implemented method comprises executing on the processor the steps of:

presetting by the processor at least one network address category, and setting a keyword corresponding to each network address category; and correspondingly, the categorizing the bookmark link address requested for categorization specifically comprises executing on the processor the steps of:

extracting by the processor key information from the Web page corresponding to the bookmark link address requested for categorization, and performing word segmentation for the key information to generate a keyword;

performing by the processor a similarity comparison between the generated keyword and the preset keyword corresponding to each network address category, and using by the processor the network category corresponding to the preset keyword with the largest similarity as the categorization result.

5. The computer-implemented method according to claim 4, wherein the categorizing the bookmark link address requested for categorization specifically comprises executing on the processor the steps of:

performing link address matching by the processor in a link library for the bookmark link address requested for categorization, wherein the link library is comprised of preset link addresses, the preset link addresses being link addresses corresponding to preset network address categories; and if a link address in the link library matches the bookmark link address requested for categorization, using by the processor the network address category corresponding to the matched link address as the categorization result.

6. The computer-implemented method according to claim 5, wherein a keyword is preset for the network address category correspondingly, and after performing link address matching in a link library for the bookmark link address requested for categorization, the computer-implemented method comprises executing on the processor the steps of:

if no link address in the link library matches the bookmark link address requested for categorization, extracting by the processor key information from the Web page corresponding to the bookmark link address requested for categorization, and performing by the processor word segmentation for the key information to generate a keyword; and performing by the processor a similarity comparison between the generated keyword and the preset keyword corresponding to each network address category, and using by the processor the network category corresponding to the preset keyword with the largest similarity as the categorization result.

7. The computer-implemented method according to claim 4, wherein before categorizing the bookmark link address requested for categorization, the computer-implemented method comprises executing on the processor the steps of:

presetting by the processor at least one network address category; and the categorizing the bookmark link address requested for categorization specifically comprises executing on the processor the steps of:

if no preset network address category matches the bookmark link address requested for categorization, using by the processor a default category as the categorization result.

8. A server, including a processor and a memory, for intelligent categorization of bookmarks, comprising:

an acquiring module, configured to acquire a bookmark link address requested for categorization by a client;

a categorizing module, configured to categorize the bookmark link address requested for categorization;

a returning module, configured to return a categorization result as a bookmark category to the client; and a presetting module, configured to preset a network address category, and preset a link address corresponding to the network address category, wherein the preset link addresses constitute a link library;

correspondingly, the categorizing module comprises:

a first categorizing unit, configured to perform link address matching in the link library for the bookmark link address requested for categorization;

a first matching unit, configured to use, if the link library has a link address matches the bookmark link address requested for categorization, the network address category corresponding to the matched link address as the categorization result, wherein the presetting module is further configured to preset a keyword corresponding to the network address category, and correspondingly, the categorizing module further comprises:

a first generating unit, configured to: after the first categorizing unit performs link address matching in the link library for the bookmark link address requested for categorization, if no link address in the link library matches the bookmark link address requested for categorization, extract key information from the Web page corresponding to the bookmark link address requested for categorization, and perform word segmentation for the key information to generate a keyword; and a second matching unit, configured to perform a similarity comparison between the generated keyword and the preset keyword corresponding to each network address category, and use the network category corresponding to the preset keyword with the largest similarity as the categorization result.

9. The server according to claim 8, further comprising:

a presetting module, configured to preset at least one network address category, and set a keyword corresponding to each network address category; and correspondingly, the categorizing module comprises:

a second generating unit, configured to extract key information from the Web page corresponding to the bookmark link address requested for categorization, and perform word segmentation for the key information to generate a keyword; and a third matching unit, configured to perform a similarity comparison between the generated keyword and the preset keyword corresponding to each network address category, and use the network category corresponding to the preset keyword with the largest similarity as the categorization result.

10. The server according to claim 8, further comprising:

a presetting module, configured to preset at least one network address category; and correspondingly, the categorizing module comprises:

a default processing unit, configured to use, if no preset network address category matches the bookmark link address requested for categorization, a default category as the categorization result.

11. A server, including a processor and a memory, for intelligent categorization of bookmarks, comprising:

an acquiring module, configured to acquire a bookmark link address requested for categorization by a client;

a categorizing module, configured to categorize the bookmark link address requested for categorization;

a returning module, configured to return a categorization result as a bookmark category to the client; and a presetting module, configured to preset a network address category, and preset a link address corresponding to the network address category, wherein the preset link addresses constitute a link library;

correspondingly, the categorizing module comprises:

a first categorizing unit, configured to perform link address matching in the link library for the bookmark link address requested for categorization;

a first matching unit, configured to use, if the link library has a link address matches the bookmark link address requested for categorization, the network address category corresponding to the matched link address as the categorization result;

a presetting module, configured to preset at least one network address category, and set a keyword corresponding to each network address category;

correspondingly, the categorizing module comprises:

a second generating unit, configured to extract key information from the Web page corresponding to the bookmark link address requested for categorization, and perform word segmentation for the key information to generate a keyword; and a third matching unit, configured to perform a similarity comparison between the generated keyword and the preset keyword corresponding to each network address category, and use the network category corresponding to the preset keyword with the largest similarity as the categorization result.

12. The server according to claim 11, wherein the presetting module is further configured to preset a keyword corresponding to the network address category, and correspondingly, the categorizing module further comprises:

a first generating unit, configured to: after the first categorizing unit performs link address matching in the link library for the bookmark link address requested for categorization, if no link address in the link library matches the bookmark link address requested for categorization, extract key information from the Web page corresponding to the bookmark link address requested for categorization, and perform word segmentation for the key information to generate a keyword; and a second matching unit, configured to perform a similarity comparison between the generated keyword and the preset keyword corresponding to each network address category, and use the network category corresponding to the preset keyword with the largest similarity as the categorization result.

13. The server according to claim 11, further comprising:

a presetting module, configured to preset at least one network address ategory; and correspondingly, the categorizing module comprises:

a default processing unit, configured to use, if no preset network address category matches the bookmark link address requested for categorization, a default category as the categorization result.

* * * * *